US007273580B2

(12) United States Patent
Kirsten et al.

(10) Patent No.: US 7,273,580 B2
(45) Date of Patent: Sep. 25, 2007

(54) FERROMAGNETIC RESONANCE EXCITATION AND ITS USE FOR HEATING SUBSTRATES THAT ARE FILLED WITH PARTICLES

(75) Inventors: Christian Kirsten, Burscheid (DE); Marcel Roth, Duesseldorf (DE); Olaf Lammerschop, Krefeld (DE); Hans-Martin Sauer, Darmstadt (DE)

(73) Assignee: Henkel Kommanditgesellschaft auf Aktien (Henkel KGAA), Duesseldorf (DE)

( * ) Notice: Subject to any disclaimer, the term of this patent is extended or adjusted under 35 U.S.C. 154(b) by 246 days.

(21) Appl. No.: 10/343,405

(22) PCT Filed: Jul. 24, 2001

(86) PCT No.: PCT/EP01/08515

§ 371 (c)(1),
(2), (4) Date: Jan. 29, 2003

(87) PCT Pub. No.: WO02/13580

PCT Pub. Date: Feb. 14, 2002

(65) Prior Publication Data

US 2004/0026028 A1   Feb. 12, 2004

(51) Int. Cl.
*B32B 37/06* (2006.01)
*B32B 38/10* (2006.01)
*H05B 6/64* (2006.01)

(52) U.S. Cl. .................. 264/489; 156/272.4; 156/344; 264/432

(58) Field of Classification Search ............. 156/272.4, 156/344; 264/432, 489
See application file for complete search history.

(56) References Cited

U.S. PATENT DOCUMENTS

| 4,167,661 A | * | 9/1979 | Ohkubo ....................... 219/754 |
| 4,626,642 A | * | 12/1986 | Wang et al. ................. 219/759 |
| 4,635,415 A | | 1/1987 | Schumacher et al. |
| 4,640,838 A | * | 2/1987 | Isakson et al. ............... 426/107 |
| 4,822,966 A | * | 4/1989 | Matsubara ................... 219/730 |
| 4,882,399 A | | 11/1989 | Tesoroe et al. |
| 5,189,078 A | * | 2/1993 | Johnson et al. .............. 523/137 |
| 5,540,357 A | * | 7/1996 | Malofsky ..................... 222/105 |
| 5,541,391 A | * | 7/1996 | Seong .......................... 219/761 |
| 5,609,774 A | * | 3/1997 | Yamazaki et al. ............ 216/69 |
| 5,833,795 A | * | 11/1998 | Smith et al. ............. 156/272.4 |
| 5,998,775 A | * | 12/1999 | Sung ........................... 219/751 |
| 6,076,957 A | * | 6/2000 | Gomes ........................ 366/274 |
| 6,103,812 A | * | 8/2000 | Wei et al. .................... 524/496 |
| 6,183,658 B1 | | 2/2001 | Lesniak et al. |
| 6,245,177 B1 | | 6/2001 | Luhmann |
| 6,444,308 B1 | * | 9/2002 | Ferrante ....................... 428/349 |
| 7,147,742 B2 | * | 12/2006 | Kirsten ..................... 156/272.2 |
| 2005/0039848 A1 | * | 2/2005 | Kirsten ..................... 156/272.4 |
| 2005/0140065 A1 | * | 6/2005 | Sauer et al. ................. 264/489 |
| 2005/0252607 A1 | * | 11/2005 | Kirsten et al. ........... 156/272.4 |
| 2006/0289113 A1 | * | 12/2006 | Cura et al. ............... 156/272.4 |

FOREIGN PATENT DOCUMENTS

| CA | 2 073 092 | | 1/1993 |
| DE | 35 01 490 | A1 | 7/1986 |
| DE | 42 30 116 | A1 | 3/1994 |
| DE | 43 28 108 | A1 | 2/1995 |
| DE | 195 26 351 | A1 | 1/1997 |
| DE | 196 14 136 | A1 | 10/1997 |
| DE | 197 26 282 | A1 | 12/1998 |
| DE | 198 32 629 | A1 | 2/2000 |
| DE | 199 54 960 | A1 | 6/2000 |
| DE | 199 04 835 | A1 | 8/2000 |
| DE | 199 24 138 | A1 | 11/2000 |
| EP | 0 521 825 | A2 | 6/1992 |
| EP | 0 734 048 | A1 | 9/1996 |
| EP | 0 735 121 | A2 | 10/1996 |
| WO | WO87/01724 | A1 | 3/1987 |
| WO | WO94/12582 | A1 | 6/1994 |
| WO | WO99/07774 | A1 | 2/1999 |
| WO | WO99/24520 | A1 | 5/1999 |
| WO | WO 2005060316 | A1 * | 6/2005 |

OTHER PUBLICATIONS

The Earth's Magnetic Field—An Overview; http://www.geomag.bgs.ac.uk/earthmag.html.*
Compute Earth's Magnetic Field Values, National Geophysical Data Center, http://www.ngdc.noaa.gov/seg/geomag/magfield.shtml.*
Sastri et al., "Reversible Crosslinking in Epoxy Resins", Journal of Applied Polymer Science, vol. 39, pp. 1439-1457 (1990).
Habenicht, Kleben: Grundlagen Technologie, Anwendungen, vol. 3, Chapters 2.3.4.4, pp. 123-124 (1997).

* cited by examiner

*Primary Examiner*—Mark A. Osele
(74) *Attorney, Agent, or Firm*—Woodcock Washburn LLP

(57) ABSTRACT

Process for heating a substrate, which contains, relative to the total weight of the substrate, 0.1 to 70 wt. % of metallic, magnetic, ferrimagnetic, ferromagnetic, antiferromagnetic or superparamagnetic particles having an average particle size of between 1 and 5000 nm, wherein the substrate is exposed to electromagnetic radiation, characterized in that the electromagnetic radiation comprises microwave radiation with a frequency in the range from 1 to 300 GHz and the substrate is simultaneously exposed to a direct-current magnetic field, the field strength of which is at least twice the strength of the earth's magnetic field; use of the process for producing or detaching adhesive bonds; device for the simultaneous production of microwave radiation with a frequency within the range from 1 to 300 GHz and a direct-current magnetic field, the field strength of which is at least twice the strength of the earth's magnetic field.

11 Claims, 1 Drawing Sheet

Figure 1:
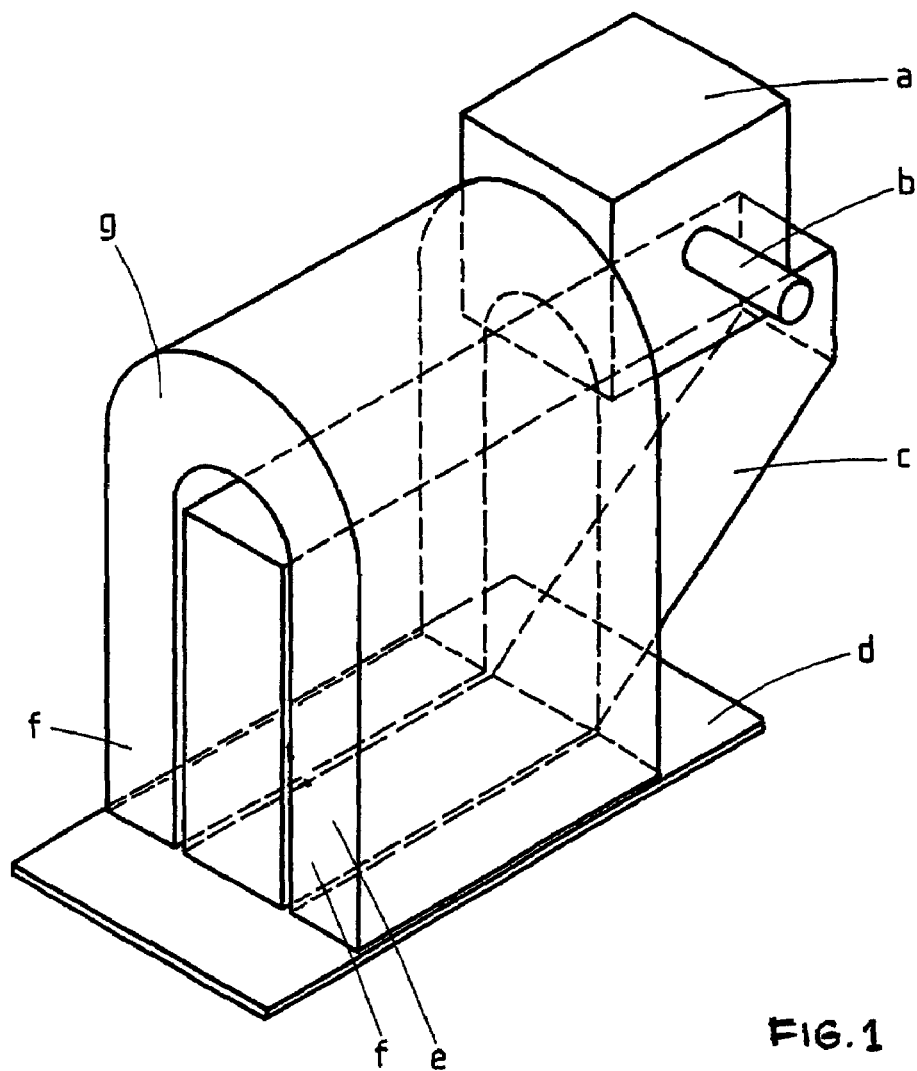

FERROMAGNETIC RESONANCE EXCITATION AND ITS USE FOR HEATING SUBSTRATES THAT ARE FILLED WITH PARTICLES

CROSS REFERENCE TO RELATED APPLICATIONS

This application is a national stage application under 35 USC 371 on international application PCT/EP01/08515 filed on Jul. 24, 2001, the international application not being published in English. This application also claims priority under 35 USC 119 to DE 100 37 883.8 filed on Aug. 3, 2000.

BACKGROUND OF THE INVENTION

The present invention relates to a process and to a device for heating particle-filled substrates by simultaneous exposure to microwaves and a direct-current magnetic field. This process may be used for heating such substrates for general purposes. It is particularly suitable for substrates comprising a set or unset adhesive or a hot melt adhesive. Depending upon the embodiment, the process may be used for adhesively bonding the surfaces of articles, wherein an unset adhesive or a hot melt adhesive gives rise to an adhesive bond of the surfaces of the articles as a result of the heating. In another embodiment, the process may be used to detach adhesive bonds, wherein in the case of suitable adhesives, such as for example hot melt adhesives, this may proceed reversibly. On exposure to microwave radiation and the direct-current magnetic field, the adhesive is heated, such that the bonded articles, optionally with the application of mechanical force, may be separated one from the other.

In many sectors of industry, in particular in the metals processing industry, such as the automotive industry, in commercial vehicle construction and the supply industry thereof, also in the manufacture of machinery and household appliances, and also in the construction industry, identical or different metallic and non-metallic substrates are increasingly commonly being adhesively or sealingly bonded together. This type of joining of components is increasingly replacing conventional joining methods such as riveting, bolting or welding, because adhesive bonding/sealing offers a range of technical advantages. In contrast to the case of traditional joining methods such as welding, riveting, bolting, the problem of detaching and separating adhesively bonded components has in many cases not yet satisfactorily been resolved.

EP-A-735121 describes a portion of adhesive film for providing an adhesive bond which leaves no residues, causes no damage and is detachable consisting of a double-sided adhesive film having a projecting tab of the adhesive film, by means of which tab the adhesive bond may be detached by pulling in the direction of the plane of the bond. This process may, however, only be used if the adhesive layer of the adhesive film is a pressure sensitive adhesive. However, only low tensile or peel strengths may be achieved with such adhesive bonds, such that this method may only be used in household applications for attaching small articles such as hooks and the like.

DE-A-4230116 describes an adhesive composition containing a blend of an aliphatic polyol with an aromatic dianhydride. This adhesive composition permits dissolution of the adhesive bond in aqueous alkaline systems, with soda solution or alkali metal hydroxide solutions specifically being mentioned. It is proposed to use these aqueous alkaline soluble adhesives to facilitate production of magnetic parts and other small parts, wherein the adhesive is only intended to be used to provide auxiliary bonds during materials processing. Very similar adhesives are also known as labeling adhesives, which permit the removal of labels from beverage bottles and similar containers.

DE-A-4328108 describes an adhesive for floor coverings and a process for detaching these adhesively bonded floor coverings using microwave energy. To this end, the adhesive should be electrically conductive and be softenable by a microwave apparatus. Specifically, said document proposes solvent free contact adhesives based on (aqueous) polymer dispersions which contain copper powder or aluminum powder. According to the teaching of this document, the adhesively bonded pieces of floor covering are placed in a microwave apparatus to detach the adhesive bond, such that the adhesive layer may be softened and the pieces of floor covering may be peeled off manually once the adhesive layer has softened.

WO 94/12582 describes a pressure sensitive adhesive based on a mixture of an aqueous polymer dispersion and an adhesive dissolved in an organic solvent together with tackifying components and thickeners. This pressure sensitive adhesive has a constant adhesive strength over a wide temperature range and permits mechanical separation of the adhesive bonds. It is stated that these adhesive bonds are suitable for bonding insulating and/or decorative surface parts, for example isulating materials or plastics films.

DE-A-19526351 describes a dissolving gel for lacquers, paints and adhesives based on organic solvents with the addition of wetting agents, thickeners and other conventional agents. One specific application which is mentioned is use as a stripper for removing two component lacquers. Although it is mentioned that such mixtures may also be used for two component adhesives, no specific details are stated with regard to detaching such adhesive bonds. Similarly, WO 87/01724 describes a composition for removing cured polysulfide sealants or coatings. In this case, an alkali metal thiolate or ammonium thiolate based on alkyl or phenyl thiolates is dissolved in a solvent or solvent mixture consisting of dimethylformamide or dimethylacetamide or a mixture thereof with aromatic solvents such as toluene or xylene and applied onto cured polysulfide sealants or coating materials, such that these may then be removed from their substrates, such as aircraft tanks. No details are stated with regard to detaching adhesive bonds.

In the paper Reversible crosslinking in epoxy resins, Journal of Applied Polymer Science, 39, 1439-1457 (1990), V. R. Sastri and G. C. Tesoro describe epoxy resins with differing epoxy equivalents which are crosslinked with 4,4'-dithioaniline. It is suggested in this paper to grind the crosslinked resin into particles of a size of 600 μm. This finely ground powder is then refluxed in a solution of diglyme, hydrochloric acid and tributyl phosphine until the ground resin has dissolved. The same authors make similar disclosures in U.S. Pat. No. 4,882,399. Neither document gives specific details with regard to detachable adhesive bonds.

WO 99/07774 describes adhesives, in which at least one synthesis component contains di- or polysulfide bonds and which, once cured, may be detached by applying solutions of cleaving agents based on mercapto compounds. In this manner, it is possible to separate adhesively bonded components by chemical means in the glueline. According to the teaching of this document, the cleaving agent may also be incorporated into the adhesive formulation in a form which is inert at room temperature, wherein cleavage may proceed once the reagent has been activated at elevated temperature.

Specific embodiments of this inert form of the cleaving agent are not stated. Although using cleaving agents containing solvents permits the detachment of adhesive bonds, it is desirable to be able to dispense with cleaving agents containing solvents because this approach is very time-consuming due to the contact time with the cleaving agents which is determined by diffusion processes, handling of cleaving agents containing solvents should be avoided on environmental protection grounds.

DE-A-19924138 describes adhesive compositions, which contain nanoscale particles having ferromagnetic, ferrimagnetic, superparamagnetic or piezoelectric characteristics in the binder system. These adhesive compositions are suitable for producing detachable adhesive bonds. On exposure to electromagnetic radiation, these adhesive compounds may be heated to such an extent that the adhesive bond may readily be detached.

DE-A-35 01 490 describes glazing adhesively bonded into an automotive body using an elastomeric crosslinked adhesive. This glazing has on its surface in the bonding area a conductive track provided with electrical terminals, which track bears on the side facing towards the adhesive a release layer of a thermally fusible material, such as soft solder or a thermoplastic. The adhesive bond is detached by supplying electricity to the conductive track, which heats up, melts the release layer and the glazing may be detached from the body.

EP-A-0521825 describes a detachable adhesive bond, in which the bonded components are joined by a bead of adhesive placed between them. This bead of adhesive contains a two-dimensional thermoplastic release element. This thermoplastic release element contains intrinsically conductive polymers, electrically conductive carbon blacks, graphite, metal powder, metal fibers or metal needles, metal coated fillers, metal coated glass microbeads, metal coated textile fibers or mixtures of these materials. When the adhesive bond is heated by electricity or input of radiation, this thermoplastic release layer is softened, such that the joined parts may be separated from each other mechanically. EP-A-521825 specifically proposes using such detachable adhesive bonds for direct glazing in automotive construction.

SUMMARY OF THE INVENTION

The object of the present invention is to provide a novel process for heating a substrate, in particular an adhesive, wherein irradiated energy is converted into heat only within the substrate and with particularly high levels of efficiency. In particular, this process is intended to permit the purposeful production or, optionally reversible, purposeful detachment of adhesive bonds.

DETAILED DESCRIPTION OF THE INVENTION

This invention relates to a process for heating a substrate, which contains, relative to the total weight of the substrate, 0.1 to 70 wt. %, preferably 1 to 30 wt. %, in particular 5 to 20 wt. %, of metallic, magnetic, ferrimagnetic, ferromagnetic, antiferromagnetic or superparamagnetic particles having an average particle size of between 1 and 5000 nm, wherein the substrate is exposed to electromagnetic radiation, characterized in that the electromagnetic radiation comprises microwave radiation with a frequency in the range from 1 to 300 GHz and that the substrate is simultaneously exposed to a direct-current magnetic field, the field strength of which is at least twice the strength of the earth's magnetic field.

The stated exposure to microwave radiation in conjunction with the direct-current magnetic field gives rise to the phenomenon of ferromagnetic resonance in the particles incorporated into the substrate. The existence of ferromagnetic resonance (FMR), a electromagnetic resonance phenomenon in ferromagnetic bodies which is based on the coherent precession of the atomic magnetic moments, has been known in principle since 1946.

Since around 1960, FMR-active materials have been more widely used in microwave switching elements. Such applications exploit the property of these FMR-active substances that they may dramatically change their reflection and transmission properties for electromagnetic waves as a function of an externally applied direct-current magnetic field. It has long been known that strong heating may occur within the FMR-active material in high power microwave equipment, but no systematic investigation of possible industrial applicability has hitherto been made.

Another industrial application of great economic significance for ferromagnetic resonance phenomena is in numerous ferrite materials, as are used in many radio and mobile communications devices as aerial material or high frequency transformers. In such applications, various magnetic metal oxides, which initially assume the form of finely divided powders, are sintered together under pressure and at elevated temperature in a mold to yield a dense workpiece. In contrast to the polymer/magnetite composites usable according to the invention, in the ferrites and likewise in the above-stated microwave switching elements, intimate contact of the individual oxide particles is considered important in order to achieve a wide and uniform resonance spectrum. In the polymer/magnetite compositions which serve to generate heat, on the other hand, what is important is to ensure the greatest possible increase in microwave absorption at an individual frequency. The bandwidth of the absorption range may (and should) remain as small as possible in this case.

Since around 1990, new potential applications for FMR-active materials in conjunction with nano-structured, superparamagnetic materials have been developing, which make it possible to perform in situ measurements of certain hydrodynamic parameters in flowing liquids. Magnetic resonance effects in ferrofluids are of particular significance, wherein, however, apart from FMR, other resonance phenomena occur which are determined by the mechanical mobility of the magnetic particles in the carrier fluid.

The heating of plastic/magnetic particle composites by alternating magnetic fields proceeds not only by the FMR-based process presented here, but also by magnetic reversal of the magnetic component in a strong external alternating current field. In contrast to the FMR-based process, heating by magnetic reversal generally exploits the magnetic hysteresis losses which occur if the magnetization of ferromagnetic materials having a coercive force other than zero is reversed in an external magnetic field. The microscopic mechanism which acts in this case is based upon the induced migration of Bloch walls between the magnetic domains of opposing directions of magnetization within each individual magnetic particle.

Apart from the FMR process described here, two further types of heat generation of superparamagnetic particles are known in principle: the first is based on the fact that at frequencies above a few MHz each magnetic material has a certain energy absorption, which is several orders of magnitude lower than the energy absorption by Bloch wall migration described above. It must also be borne in mind in this connection that it is often difficult in practice precisely to distinguish the superparamagnetic behavior of a material from weak ferromagnetism with a small, but finite coercive force, such that it is entirely possible for superparamagnetic energy absorption in such systems also to be the result of the movement of individually occurring Bloch walls.

The second class of superparamagnetic systems comprises Brownian ferrofluids. In this case, magnetic reversal is effected by the magnetic particles rotating as a whole in the surrounding carrier fluid under the action of a changing magnetic field. The magnetic reversal and consequently generation of heat thus cannot be related to the hysteresis of the magnetic material component, but are instead dependent upon the viscous friction of the particles in the carrier fluid. Since the magnetic particles rotate comparatively slowly, frequencies of the order of a few kilohertz are sufficient to generate considerable heat. Obviously, however, Brownian ferrofluids are not suitable as an energy absorbing additive for heating solid matrices, as they lose their superparamagnetic characteristics in the "solidified" state.

The FMR-based process according to the invention is usable for any of the described composites, as heat generation is not tied to the reorientation of atomic magnetic moments, but instead only to the gyratory precession thereof around a resting direction of any desired orientation.

Heating in the FMR process may here be controlled by a direct-current field (direct-current magnetic field) superimposed upon the microwave field. Field variations of the order of around 10 kA/m are sufficient to switch microwave absorption on or off. The energy absorption of the plastic/magnetic particle composite may be varied spatially and heating patterns purposefully produced by appropriate selection of the field-strength distribution of the superimposed magnetic field. This is not possible with heating by magnetic reversal.

Another difference between the heating process by magnetic reversal and the FMR process is that, in the presence of metal components, the former brings about strong eddy currents and thus generally unwanted heating of these components, while the latter exhibits no such secondary effect. The physical cause of this differing behavior resides in the very different operating frequencies of the two processes. While alternating fields of a frequency of below approx. 1 MHz are used for heating by magnetic reversal, frequencies of several GHz are used in the FMR process. At such high frequencies, due to the "skin" effect, the alternating magnetic field is not capable of penetrating a metal surface and thus inducing eddy currents. In the present case, the presence of a metal surface may even be considered a favorable circumstance, as said surface promotes the concentration of the microwave energy in a lacquer or adhesive layer containing magnetic particles which has been applied onto the metal surface.

As already indicated above, the substrate to be heated preferably comprises a plastic. The heating of plastics containing an addition of a finely divided (nanocrystalline), pulverulent, for example ferro- or superparamagnetic, substance in a microwave field is based, as described below in greater detail, upon the excitation of ferromagnetic resonance modes: the plastic/magnetic powder mixture is exposed to a microwave field in a special microwave cavity resonator. The microwave resonator is equipped with an additional permanent magnet or electromagnet, which generates a direct-current magnetic field, the field lines of which, within the heating zone, are preferably perpendicular to the magnetic field lines of the microwave field. The frequency f of the microwaves and strength $H_{dc}$ of the direct-current magnetic field are adjusted such that the equation $$f = \gamma \mu_0 (H_{dc} + H_A + q_m M_s) \qquad \text{(formula 1)}$$

is met, wherein $\gamma$ equals 28.0 GHz/T, the gyromagnetic constant, $\mu_0$ equals $4\pi \ 10^{-7}$ Vs/Am, the permeability of free space, $H_A$ and $M_s$ represent the specific magnetic crystal anisotropy field and the saturation magnetization of the ferromagnetic material component (in units of A/m), and $q_m$ represents the geometric factor specific to the excited resonance modes (in the case of the "homogeneous" resonance modes in spherical magnetic particles, $q_m$ is equal to 0).

On the basis of the equation $$\Delta W / \Delta V = \pi \mu_0 f I_{m\chi(f)} (H_{rf})^2 \qquad \text{(formula 2)}$$

the magnetic material component converts the microwave field energy into a thermal output $\Delta W$ per unit volume $\Delta V$, wherein $H_{rf}$ is the effective magnetic field strength value of the microwave field of frequency f and $I_{m\chi(f)}$ is the imaginary part of the magnetic high frequency susceptibility $$\chi(f) = \gamma M_s f_{res} c / [(f - 2\pi \iota / \tau)^2 - f_{res}^2] \qquad \text{(formula 3)}$$

of the composite at a content by volume c of magnetic nano-material with a resonance frequency $f_{res}$ according to the formula 1 and an average life $\tau \sim 2$ ns of the FMR resonance mode which is determined by the nature of the composite. The imaginary part of the high frequency susceptibility and thus the microwave absorption of the composite has a sharp maximum at frequency $f = f_{res}$.

In the process according to the invention, the direct-current magnetic field is preferably adjusted such that the field strength thereof in at least a spatial zone in which the substrate to be heated is located is at least twice the strength of the earth's magnetic field at the particular location at which the process is performed.

The metallic, magnetic, ferrimagnetic, ferromagnetic, antiferromagnetic or superparamagnetic particles preferably have an average particle size of between 1 and 500, in particular of between 2 and 100, for example between 5 and 30 nm. It has recently become conventional to refer to particles having such particle sizes in the nanometer range as "nanoparticles". Processes for the production of such nanoparticles are known in the prior art, for example from DE-A-196 14 136. In order to reduce the tendency of such nanoscale particles to agglomerate or coalesce, they are conventionally surface modified or surface coated. The bond with the organic matrix may also be improved by suitable surface coating. Columns 8 to 10 of the cited DE-A-196 14 136 describe a process for the production of agglomerate-free nanoscale particles using iron oxide particles by way of example. DE-A-197 26 282 states further options for surface coating nanoscale particles.

The metallic, magnetic, ferrimagnetic, ferromagnetic, antiferromagnetic or superparamagnetic particles may, for example, be selected from among aluminum, cobalt, iron, nickel or the alloys thereof, metal oxides of the type of barium hexaferrite, n-maghemite ($\gamma$-$Fe_2O_3$), n-magnetite ($Fe_3O_4$) or ferrites of the $MeFe_2O_4$ type, wherein Me is a divalent metal selected from among manganese, copper, zinc, cobalt, nickel, magnesium, calcium, cadmium. Suitable particles in this connection are in particular those in which the average life of magnetic excitation by a 2.45 GHz field is at least 2 nanoseconds. This is only the case for nanoscale particles, in particular for superparamagnetic particles. A preferred example of such a material is magnetite.

The electromagnetic radiation selected is preferably microwave radiation with a frequency in the range from 1.5 to 10 GHz, in particular in the range from 2 to 3 GHz.

The substrate is preferably exposed to the direct-current magnetic field in such a manner that the magnetic field lines of the direct-current field within the substrate extend at least in part, i.e. at at least one point, at an angle of between 45 and 135° relative to the directional vector of the electromagnetic radiation. At at least one point within the substrate, this angle is preferably as close as possible to 90° C., for example in the range between 80 and 100°.

For the purposes of industrial application for the production or (reversible) detachment of adhesive bonds, the substrate preferably comprises a set or unset adhesive or a hot melt adhesive.

Any polymers suitable for adhesives may, in principle, be used as the binder matrix for the adhesives. Examples of thermoplastically softenable adhesives which may be mentioned are hot melt adhesives based on ethylene/vinyl acetate copolymers, polybutenes, styrene/isoprene/styrene or styrene/butadiene/styrene copolymers, thermoplastic elastomers, amorphous polyolefins, linear, thermoplastic polyurethanes, copolyesters, polyamide resins, polyamide/EVA copolymers, polyaminoamides based on dimer fatty acids, polyesteramides or polyetheramides. Known reactive adhesives based on one- or two-component polyurethanes, one- or two-component polyepoxides, silicone polymers (one- or two-component formulations), silane-modified polymers, as described for example in G. Habenicht, Kleben: *Grundlage, Technologie, Anwendungen*, $3^{rd}$ edition, 1997, chapter 2.3.4.4 are, in principle, also suitable. (Meth) acrylate-functional reactive adhesives based on peroxide curing agents, anaerobic curing mechanisms, aerobic curing mechanisms or UV curing mechanisms are also suitable as the adhesive matrix. Specific examples of the incorporation of thermally labile groups in reactive adhesives for the purpose of subsequent cleavage of these bonds are the adhesives according to WO 99/07774, in which at least one synthesis component contains di- or polysulfide bonds. In one particularly preferred embodiment, these adhesives may also contain solid cleaving reagents in crystalline, encapsulated, chemically blocked, topologically or sterically inactivated or kinetically inhibited, finely divided form, as are disclosed on pages 14 to 16 of the as yet unpublished document DE-A-199 04 835.5. Another possibility is to use polyurethane adhesives which contain the amine derivatives disclosed in DE-A-198 32 629 as cleaving agent. The cleaving agents disclosed in both of these above-stated documents are explicitly part of the present invention.

Various embodiments of the process according to the invention may be differentiated. The substrate may, for example, comprise an unset adhesive which sets as a result of the heating brought about by exposure to the electromagnetic radiation. This may, for example, proceed by a chemical reaction between suitable functional groups, as are known among thermally curable adhesives. In this embodiment, the purpose of the process is to permit controlled curing of the adhesive at a freely selectable time and at a freely selectable place.

In an alternative embodiment, the substrate comprises a set adhesive which softens as a result of the heating brought about by exposure to the electromagnetic radiation. In the case of chemically set adhesives, softening is based upon breaking down thermally labile bonds in the adhesive matrix. In this embodiment, the purpose of the process is to permit purposeful detachment of adhesive bonds at a freely selectable place and a freely selectable time. Detachment of the adhesive bond proceeds in this case without the action of chemicals and under conditions in which the joined materials are neither damaged nor appreciably heated.

In another embodiment, the substrate may comprise a hot melt adhesive, which reversibly softens as a result of the heating brought about by exposure to the electromagnetic radiation. This reversible softening may be used both for the purposeful production of the adhesive bond and for the purposeful detachment thereof.

The invention accordingly relates in one narrower aspect to a process for detaching adhesive bonds between the surfaces of two articles, characterized in that the adhesive bond is effected by an adhesive which contains, relative to the total weight of the adhesive, 0.1 to 70 wt. %, preferably 1 to 30 wt. %, in particular 5 to 20 wt. % of metallic, magnetic, ferrimagnetic, ferromagnetic, antiferromagnetic or superparamagnetic particles having an average particle size of between 1 and 5000 nm, wherein the adhesive is exposed to microwave radiation with a frequency in the range from 0.1 to 300 GHz and the adhesive is simultaneously exposed to a direct-current magnetic field, the field strength of which is at least twice the strength of the earth's magnetic field, wherein, a) in the case of a thermoplastic adhesive, the adhesive is heated to above the softening point of the thermoplastic binder or, b) in the case of a thermoset adhesive, the adhesive is heated to a temperature which effects dissociation of the crosslinked structure of the binder matrix, such that, optionally with application of mechanical force, the adhesively bonded surfaces of the articles may be separated one from the other.

Suitable nanoscale particles for this process are those which have been described in greater detail above with regard to their chemical nature and particle size. The above-stated conditions with regard to the preferred frequency ranges of the microwave radiation and for the preferred adjustment of the direct-current field also apply. Examples of suitable types of adhesives have likewise been stated above.

The scope of the present invention also includes a device for the simultaneous production of microwave radiation with a frequency within the range from 1 to 300 GHz and a direct-current magnetic field, the field strength of which is at least twice the strength of the earth's magnetic field, containing a magnetron, an antenna and a waveguide for the production and emission of the microwave radiation together with an electromagnet or a permanent magnet for producing the direct-current magnetic field, wherein the antenna, waveguide and electromagnet or permanent magnet are arranged such that the microwaves are emitted from the device in such a manner that the field lines of the direct-current magnetic field in at least part of the space through which the microwaves pass are at an angle of between 45 and 135° (preferably between 80° and 100°) relative to the directional vector of the electromagnetic radiation. A schematic drawing of such a device is reproduced as FIG. 1. The magnetron produces a microwave field in the stated frequency range, preferably in the range from 1.5 to 10 GHz, in particular from 2 to 3 GHz. The microwaves are emitted by the antenna into the waveguide (microwave resonator), from which they exit through the heating slot in the baseplate into the substrate to be heated. By way of example in FIG. 1, the direct-current magnetic field is produced using a permanent magnet, the magnetic poles of which are located in the vicinity of the heating slot. The magnetic field lines between the magnetic poles thus pass through the substrate to be heated which is beneath the baseplate. Due to the particularly simple embodiment of the device according to the invention, it is preferred to use a permanent magnet. A suitably arranged electromagnet could, however, also be used and would have the additional advantage that the magnetic field strength may be adjusted by selecting the current intensity.

The present invention furthermore relates to the use of this device in the above-described process for heating a substrate, in particular for the controlled production or detachment of an adhesive bond.

The process according to the invention and the device according to the invention may in particular be used for disassembling adhesively bonded appliances and vehicles for repair, recycling and/or disposal purposes and for the controlled production of adhesive bonds during manufacture.

FIG. 1

Schematic drawing of a device which produces microwaves and a direct-current magnetic field.

What is claimed is:

1. A process for heating a substrate which contains—based on the total weight of the substrate—0.1 to 70% by weight of metallic, magnetic, ferrimagnetic, ferromagnetic, antiferromagnetic or superparamagnetic particles, said particles having an average particle size of 1 to 5,000 nm, comprising simultaneously exposing the substrate to electromagnetic radiation comprising microwave radiation and a direct current magnetic field, wherein the direct magnetic field excites ferromagnetic resonance modes in said particles to convert the microwave radiation into heat, wherein the strength of the direct current magnetic field, $H_{dc}$, is selected according to the formula $$f = \gamma \mu_0 (H_{dc} + H_A + q_m M_s)$$

wherein f is the microwave frequency, $\gamma$ is the gyromagnetic constant, $\mu_0$ is the permeability of free space, $H_A$ is the specific magnetic crystal anisotropy field of the nanoparticles, $q_m$ is the geometric factor specific to the excited ferromagnetic resonance modes, and $M_s$ is the saturation magnetization of the excited ferromagnetic resonance modes.

2. The process of claim 1 wherein the microwave radiation has a frequency in the range of from 1 to 300 GHz and the direct current magnetic field is provided by a permanent magnet or an electromagnet.

3. The process of claim 1 wherein the metallic, magnetic, ferrimagnetic, ferromagnetic, antiferromagnetic or superparamagnetic particles have an average particle size of 1 to 500 nm.

4. The process of claim 1 wherein the metallic, magnetic, ferrimagnetic, ferromagnetic, antiferromagnetic or superparamagnetic particles are selected from the group consisting of aluminum, cobalt, iron, nickel or alloys thereof, metal oxides of the barium hexaferrite, n-maghemite ($\gamma$-$Fe_2O_3$) or n-magnetite ($Fe_3O_4$) type and ferrites of the $MeFe_2O_4$ type, where Me is a divalent metal selected from manganese, copper, zinc, cobalt, nickel, magnesium, calcium and cadmium.

5. The process of claim 1 wherein the microwave radiation has a frequency in the range from 1.5 to 10 GHz.

6. The process of claim 1 wherein the substrate is exposed to the direct current magnetic field in such a way that the magnetic field lines of the direct current field within the substrate extend at least partly at an angle of 45° to 135° to the directional vector of the electromagnetic radiation.

7. The process of claim 1 wherein the substrate comprises a set or unset adhesive or a hotmelt adhesive.

8. The process of claim 7 wherein the substrate comprises an unset adhesive which sets as a result of the heating effect of exposure to the electromagnetic radiation.

9. The process of claim 7 wherein the substrate comprises a set adhesive which softens as a result of the heating effect of exposure to the electromagnetic radiation.

10. The process of claim 7 wherein the substrate comprises a hotmelt adhesive which softens as a result of the heating effect of exposure to the electromagnetic radiation.

11. The process of claim 1, wherein $q_m$ is zero for spherical nanoparticles.

* * * * *